(12) United States Patent
Kuki et al.

(10) Patent No.: US 8,211,348 B2
(45) Date of Patent: Jul. 3, 2012

(54) MANUFACTURING METHOD OF CYLINDRICAL MEMBER AND MANUFACTURING METHOD OF VIBRATION DAMPING RUBBER BUSHING HAVING THE CYLINDRICAL MEMBER

(75) Inventors: Norimasa Kuki, Komaki (JP);
Yoshikane Akiyama, Komaki (JP);
Mitiharu Hikosaka, Komaki (JP);
Kazuhiko Kato, Komaki (JP);
Kazumasa Sekido, Nagoya (JP);
Daisuke Ueda, Nagoya (JP); Harumi Niwa, Tajimi (JP); Hiroshi Itazu, Kani (JP); Yuji Mizuno, Kani (JP)

(73) Assignees: Tokai Rubber Industries, Ltd., Komaki-shi (JP); Sekido Kiko Mfg. Co., Ltd., Nagoya-shi (JP)

( * ) Notice: Subject to any disclaimer, the term of this patent is extended or adjusted under 35 U.S.C. 154(b) by 206 days.

(21) Appl. No.: 12/821,429

(22) Filed: Jun. 23, 2010

(65) Prior Publication Data
US 2010/0327486 A1    Dec. 30, 2010

(30) Foreign Application Priority Data

Jun. 29, 2009    (JP) .................................. 2009-154036

(51) Int. Cl.
*B28B 1/02*    (2006.01)

(52) U.S. Cl. ........ 264/310; 264/311; 264/312; 264/236; 425/363; 425/385; 425/471

(58) Field of Classification Search ................. 264/310, 264/311, 312, 239; 425/363, 385, 471
See application file for complete search history.

(56) References Cited

FOREIGN PATENT DOCUMENTS
| JP | A-5-237582 | 9/1993 |
|----|------------|--------|
| JP | A-2004-230740 | 8/2004 |
| JP | U-3127524 | 12/2006 |

*Primary Examiner* — Christina Johnson
*Assistant Examiner* — Saeed Huda
(74) *Attorney, Agent, or Firm* — Oliff & Berridge, PLC (57) ABSTRACT

A method of manufacturing a cylindrical member having anti-slip projections formed on axial end faces, the method comprising the steps of: employing a roller die, which is provided with a circumferential die groove of annular form extending through a medial section in a generatrix direction of a die face defined by an integral tapered outside peripheral face, and with a plurality of sloping die grooves extending in a tapered slope direction of the die face situated to both large-diameter and small-diameter sides of the circumferential die groove; providing plastic working to the axial end face with the small-diameter side of the roller die facing towards an inner peripheral side of the cylindrical member and with the large-diameter side facing towards an outer peripheral side, by pushing the die face against the axial end face while rotating circumferentially; and forming simultaneously an annular water barrier projection and the anti-slip projections.

4 Claims, 7 Drawing Sheets

PRIOR ART

US 8,211,348 B2

MANUFACTURING METHOD OF CYLINDRICAL MEMBER AND MANUFACTURING METHOD OF VIBRATION DAMPING RUBBER BUSHING HAVING THE CYLINDRICAL MEMBER

The disclosure of Japanese Patent Application No. 2009-154036 filed on Jun. 29, 2009 including the specification, drawings and abstract is incorporated herein by reference in its entirety.

BACKGROUND OF THE INVENTION

1. Field of the Invention

The present invention relates to a method of manufacturing a cylindrical member having anti-slip projections formed on the axial end faces thereof, and to a method of manufacturing a vibration damping rubber bushing employing the cylindrical member.

2. Description of the Related Art

Cylindrical members have been widely used as structural members by themselves, as well as for components such as inner cylindrical members in vibration damping rubber bushings. One known design of such a cylindrical member is provided on its axial end faces with a plurality of anti-slip projections extending in the diametrical direction, formed in a spokewise pattern overall in the circumferential direction with the object of positioning the fitting and preventing it from rotating with respect to the mounting faces of other components.

Such anti-slip projections are typically produced by subjecting the axial end faces of the cylindrical member to press working by being struck by a punch having a ridged and furrowed pattern on its distal end face, as disclosed in JP-A 5-237582 and JP-A 2004-230740.

However, where anti-slip projections have been formed on the axial end faces of a cylindrical member, when the cylindrical member is installed with its axial end faces pushed against the mounting faces of a component of a vibration-damped linkage, gaps tend to form between the axial end face of the cylindrical member and the opposed face of the other component between adjacent anti-slip projections. A resultant risk is that rainwater can seep through these gaps and penetrate to the inner circumferential face of the cylindrical member, causing problems such as rust or corrosion.

In order to address this problem of penetration by rainwater it could be contemplated to redesign the shape of the anti-slip projections that are produced on the axial end faces of the cylindrical member, but a problem is that conventional press working processes of the sort discussed above were limited in terms of the pattern of projections that could be produced. Thus, it was not possible to avoid using anti-slip projections of conventional construction extending in a spokewise pattern overall in the diametrical direction, which made it exceedingly difficult to solve the issue of penetration by rainwater through modification of the shape and pattern of the projections.

SUMMARY OF THE INVENTION

It is therefore one object of this invention to provide a novel method of manufacturing a cylindrical member that, without necessitating larger or more complex processing equipment, affords improved freedom in the design of a pattern of projections that are formed on the axial end faces of the cylindrical member, whereby projections may be produced in a novel pattern on the axial end faces of a cylindrical member to prevent penetration of rainwater between the axial end face of the cylindrical member and the mounting face of the other component against which it is pushed, without any resultant impairment of rotation-inhibiting function.

A further object of the present invention is to provide a method of manufacturing a vibration damping rubber bushing utilizing the cylindrical member manufactured in accordance with the method of the invention.

A first mode of the present invention features a method of manufacturing a cylindrical member having anti-slip projections formed on at least one of opposite axial end faces, the method comprising the following steps of: employing a roller die having an integral tapered outside peripheral face as a die face, which is provided with a circumferential die groove of annular form extending continuously in a circumferential direction through a medial section in a generatrix direction of the die face, and with a plurality of sloping die grooves arrayed along the circumferential direction and extending in a direction of taper of sections of the die face situated respectively to both a large-diameter side and a small-diameter side of the circumferential die groove; providing plastic working to the axial end face of the cylindrical member using the roller die with the small-diameter side of the roller die facing towards an inner peripheral side of the cylindrical member and with the large-diameter side facing towards an outer peripheral side of the cylindrical member, by pushing the die face of the roller die against the axial end face of the cylindrical member while rotating in the circumferential direction; and forming simultaneously on the axial end face of the cylindrical member an annular water barrier projection that projects axially outward and extends in a circumferential direction in a diametrical medial section thereof, and a plurality of the anti-slip projections of projecting form extending in a diametrical direction to both an inner peripheral side and an outer peripheral side of the annular water barrier projection and arrayed in a spokewise pattern overall in the circumferential direction.

That is, the first mode of the invention features "plastic working of the axial end faces of the cylindrical member using a specific roller die, to simultaneously form an annular water barrier projection extending in the circumferential direction, and anti-slip projections extending in the diametrical direction to the inner peripheral side and the outer peripheral side of the annular water barrier projection respectively". This arrangement thereby attains the special technical effect of "making it possible, using processing equipment of simple design, to manufacture readily a cylindrical member provided with an annular water barrier projection adapted to prevent penetration of rainwater into the bore of the cylindrical member in association with formation of anti-slip projections on the axial end faces".

Figure 10:
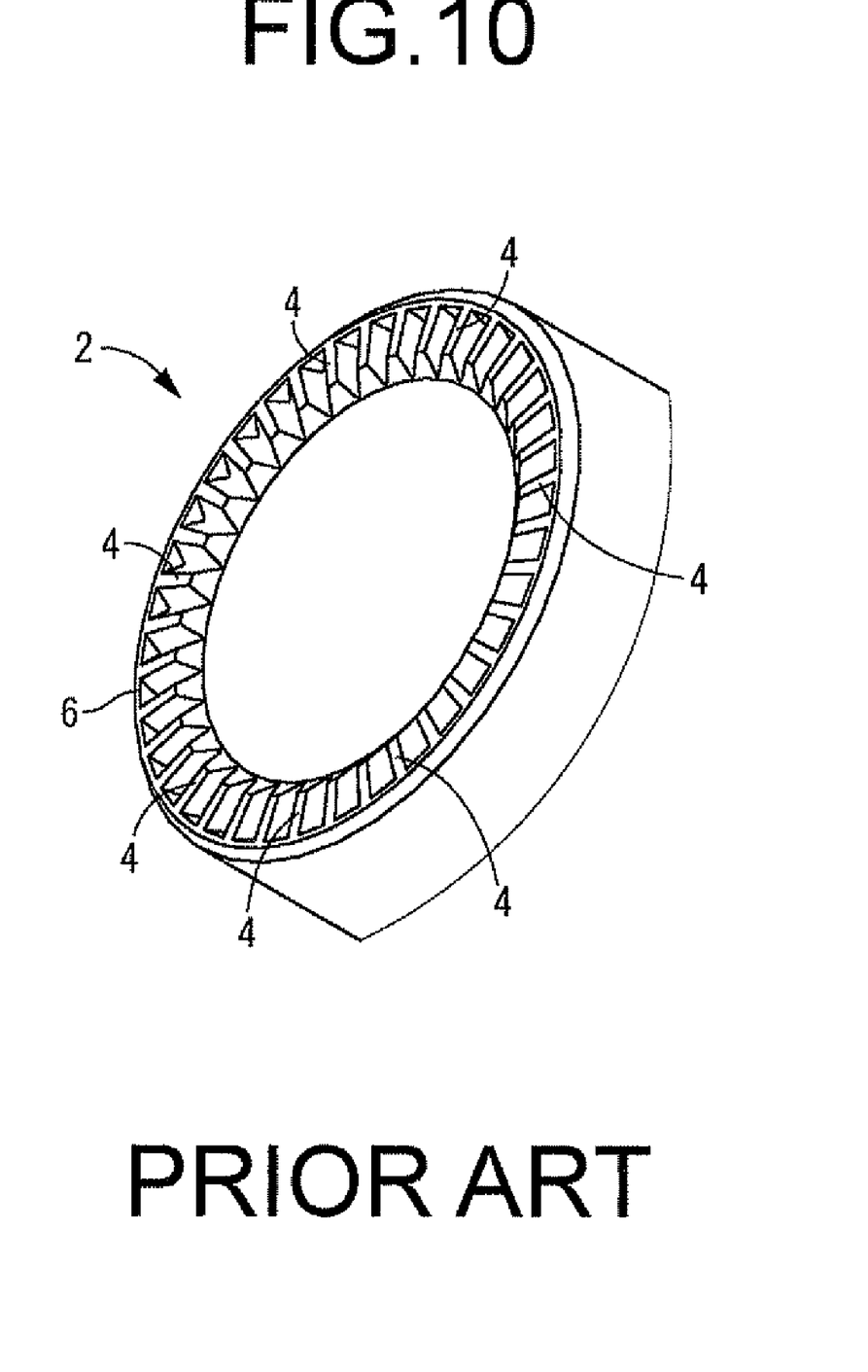
FIG. 10 is a perspective view of an axial end part of a cylindrical member as a reference example.

In order to address the problem of "penetration of rainwater into the bore of the cylindrical member in association with formation of anti-slip projections on the axial end faces" mentioned in the preceding [Background Art] section, the inventors proposed a cylindrical member 2 of novel construction, shown in FIG. 10 as a reference example. This cylindrical member 2 has formed on the axial end face numerous anti-slip projections 4 extending radially in the diametrical direction, and an outside peripheral water barrier wall 6 of annular form extending in the circumferential direction through the outside peripheral edge part so that gaps between adjacent anti-slip projections 4, 4 are blocked off by the outside peripheral water barrier wall 6. The plurality of anti-slip projections 4 and the outside peripheral water barrier wall 6 of the cylindrical member 2 push against and bite into the mounting faces of the other component, whereby the gaps between adjacent anti-slip projections 4, 4 become blocked off by the outside peripheral water barrier wall 6, thus preventing rainwater from penetrating from the outside peripheral face to the inner circumferential face of the cylindrical member 2 through these gaps.

However, in the course of further research by the inventors with the aim of practical realization of the cylindrical member 2 having this novel structure, two problems became clear.

One of the problematic points relates to manufacture and to accuracy, while the other problem is one of dependability and damage tolerance. Specifically, the former problem is that if the cylindrical member 2 depicted in FIG. 10 is manufactured either by press working as disclosed in JP-A 5-237582, or by roll working using a knurling roller depicted by way of a conventional method in FIG. 7 of JP-A 5-237582, it is difficult to produce offset thickness in the outermost peripheral section of the axial end face of the cylindrical member 2 to create the outside peripheral water barrier wall 6, and also exceedingly difficult to impart sufficient and consistent height dimension to the outside peripheral water barrier wall 6. Particularly in the case of roll working using knurling roller, owing to a high level of slip of the knurling roller relative to the outside peripheral face of the outside peripheral water barrier wall 6 which extends continuously in the circumferential direction, frictional resistance of the knurling roller becomes excessive to the point that working is even more difficult, creating a risk of damage to the knurling roller as well. The latter problem is that, during handling of the cylindrical member 2, there is a risk of the outside peripheral water barrier wall 6, which is situated in the outermost peripheral section of the axial end face of the cylindrical member 2, becoming deformed or chipped as a result of another component knocking against the outside peripheral water barrier wall 6, and of a tendency for the intended water blocking function to suffer due to such deformation or chippage. In particular, after forming the anti-slip projections 4 and the outside peripheral water barrier wall 6 on the axial end faces, depending on its intended application, the cylindrical member 2 is often subjected to an antirust process, coating process, polishing process or the like, and since these processes typically involve simultaneously processing a large number of cylindrical members 2 placed in a bucket or other receptacle, the cylindrical members 2 frequently knock against one another, so some damage to their respective outside peripheral water barrier walls 6 is to be expected.

According to the preceding first mode of the present invention which was perfected as a result of further research by the inventors, there is employed a roller die with a tapered outside peripheral face as the die face, and having a circumferential die groove formed in the medial section in the generatrix direction of the die face of the roller die, and a plurality of sloping die grooves situated to both the large-diameter side and the small-diameter side of the circumferential die groove. According to the method of the invention employing this roller die, on the axial end faces of the cylindrical member, an annular water barrier projection serving as a water barrier wall blocking the gaps between adjacent anti-slip projections in the circumferential direction is formed in the diametrical center section of the axial end face of the cylindrical member. Specifically, with the aim of preventing rainwater from penetrating through gaps between adjacent anti-slip projections in the circumferential direction, it stands to reason to contemplate formation of a water barrier wall in the outermost peripheral section of the axial end face of the cylindrical member where the openings of the gaps between anti-slip projections are located. However, according to the present invention, this idea is transformed to one of forming the water barrier wall at a location a prescribed distance away towards the inner peripheral side from the outermost perimeter of the axial end face of the cylindrical member, thereby permitting penetration of rainwater into the gaps between anti-slip projections to take place at the openings at the outer peripheral side of the axial end face of the cylindrical member, while compensating for this by reliably preventing penetration to the inner peripheral side past the diametrical medial section. As a result, the two problems inherent to the cylindrical member 2 depicted as the reference example in FIG. 10 are resolved completely, thereby making it possible for a cylindrical member of novel construction affording both rotation inhibiting function and water blocking function in equally high measure to be manufactured easily and with consistently high precision.

Specifically, in the cylindrical member manufactured according to the method of the present invention, gaps between adjacent anti-slip projections in the circumferential direction are eliminated by being filled in by the annular water barrier projection that projects out from the axial end face. For this reason, even if rainwater were to penetrate from the outside peripheral edge part of the axial end faces of the cylindrical member and seep between the axial end faces of the cylindrical member and the mounting faces of the other component through the gaps between adjacent anti-slip projections in the circumferential direction, its progress is blocked by the annular water barrier projection, thereby preventing water from reaching the inside peripheral edge part of the axial end faces of the cylindrical member so that it does not seep into the inner circumferential face of the cylindrical member.

Moreover, because the annular water barrier projection is formed in the diametrical medial section of the axial end face of the cylindrical member, interference or bumping against the annular water barrier projection by other components during transport or during installation is less likely as compared with where the projection is formed at the outermost peripheral portion of the axial end face of the cylindrical member for example. Thus, unanticipated damage to the annular water barrier projection can be effectively prevented, so that the intended water blocking action is achieved on a more dependable basis.

Further, the annular water barrier projection is formed in the diametrical medial section of the axial end face of the cylindrical member, with the anti-slip projections being formed to both the diametrical inner and outer sides of the annular water barrier projection. Thus, each anti-slip projection has at least a cylindrical member inside peripheral end part and outside peripheral end part, so despite that fact that the anti-slip projections substantially disappear in the annular water barrier projection formation zone, the edges to both the inner peripheral side and the outer peripheral side of the anti-slip projections will bite into the mounting face of the other component so that their rotation inhibiting function is effectively maintained. In particular, due to the large distance separating the end edge of the anti-slip projections at the end thereof lying towards outer peripheral side of the cylindrical member from the center axis of the cylindrical member, a high level of rotational moment (resistance force) acting as rotation-inhibiting force is produced, so that excellent rotation-inhibiting action is efficiently created.

Additionally, according the method of the present invention, the roller die used for plastic working has in the medial section of its die face in the generatrix direction a circumferential die groove for forming the annular water barrier projection. Thus, offset thickness on the axial end face of the cylindrical member during plastic working is established by the medial section in the generatrix direction of the die face of the roller die. For this reason, offset thickness at the axial end part of the cylindrical member during plastic working can be reduced, and dimensional accuracy may be improved. As a result it is possible to simultaneously form the anti-slip projections and the annular water barrier projection on the axial end face of the cylindrical member by using processing equipment of simple design with a roller die having a single die face with consistently high accuracy.

The circumferential die groove on the roller die is not limited to being formed at the center of the die face in the generatrix direction, and may be formed in the medial section in the generatrix direction of its die face, i.e. in a section between the two edge parts of the die face defined by a side face of truncated cone shape, and away from the two edges, in the generatrix direction. In the radial direction of the axial end face of the cylindrical member, along a straight coordinate axis having uniform scale markings with the inside peripheral edge assigned a value of 0 (the origin) and the outside peripheral edge a value of 100, the widthwise centerline of the projecting distal edge face of the annular water barrier projection may be situated in a zone between 20 and 90, preferably between 50 and 80. This is because further improved and consistent forming dimensional accuracy is achieved where, taking into consideration circumferential length commensurate with diametrical location, the location of offset thickness created by the annular water barrier projection is established further towards the outer peripheral side from the radial center of the axial end face of the cylindrical member. The sloping die grooves that extend in the tapered slope direction of the roller die need not extend parallel to the generatrix of the die face, and may be angled or curved in the circumferential direction with respect to the generatrix of the die face. That is, the anti-slip projections produced by the sloping die grooves may follow straight or curved line paths extending at an angle in the circumferential direction with respect to a diametrical line on the axial end face of the cylindrical member, and may curve in a helical pattern for example.

A second mode of the present invention provides a method of manufacturing a cylindrical member according to the first mode wherein both the circumferential die groove and the sloping die grooves on the roller die have a flared cross sectional profile of progressively larger groove width dimension towards the outside peripheral face of the roller die.

Where the roller die having the specific construction taught in the method of the present mode is employed, both the anti-slip projections and the annular water barrier projection formed thereby on the axial end face of the cylindrical member are imparted with a tapering cross sectional profile. Thus, when the anti-slip projections and the annular water barrier projection are pressed against one of the components of a vibration damped linkage, the rotation inhibiting function and water blocking function afforded through bite by the projecting distal edge portions of the anti-slip projections and the annular water barrier projection may be produced more effectively. Moreover, by employing a circumferential die groove and sloping die grooves of flared cross sectional profile in the roller die, sticking of the roller die can be prevented, so formation of the anti-slip projections and the annular water barrier projection through roll working can take place smoothly.

A third mode of the present invention provides a method of manufacturing a cylindrical member according to the first or second mode wherein the circumferential die groove and the sloping die grooves of the roller die have mutually identical depth dimension.

If either the anti-slip projections or the annular water barrier projection protrude appreciably outward beyond the other, prior to installation the protruding projections will be susceptible to damage caused by bumping against other components; and subsequent to installation there is a risk that only the protruding projections will bite, leaving the non-protruding projections with substantially no function. According to the present mode, the projecting distal edge parts of the anti-slip projections and the annular water barrier projection formed on the axial end face of the cylindrical member are positioned substantially within the same plane that extends in the axis-perpendicular direction of the cylindrical member, whereby localized damage to the projections can be avoided, and both types of projections can be disposed in conditions of stable abutment and bite so that the intended rotation inhibiting function and water blocking function are produced in a highly dependable manner.

A fourth mode of the present invention provides a method of manufacturing a vibration damping rubber bushing, wherein the end faces at both axial sides of a cylindrical member are respectively subjected to plastic working by the roller die according to the method of manufacturing a cylindrical member according to any of the first to third modes, followed by vulcanization bonding of a main rubber elastic body to the outside peripheral face of the cylindrical member.

According to the vibration damping rubber bushing having a cylindrical member with anti-slip projections and an annular water barrier projection formed on its axial end faces, by attaching the vibration damping rubber bushing with the axial end faces of the cylindrical member pressed against one component of a vibration damped linkage, rotation of the vibration damping rubber bushing relative to the component of a vibration damped linkage may be prevented, and penetration of rainwater between the cylindrical member and the component of a vibration damped linkage may be avoided. According to the manufacturing method of the present mode, a vibration damping rubber bushing affording such exceptional advantages may be produced easily with a minimum number of processing steps, by simultaneously forming the anti-slip projections and the annular water barrier projection by roll working using the roller die.

According to the method of the present invention, through plastic working by a roller die having a single die face, it is possible to simultaneously form on the axial end faces of a cylindrical member anti-slip projections that afford a rotation inhibiting function and an annular water barrier projection for blocking the gaps between adjacent anti-slip projections and preventing penetration of rainwater. The cylindrical member having anti-slip projections and an annular water barrier projection formed thereon in this way may be used advantageously for manufacturing a vibration damping rubber bushing for an automotive suspension bushing for example.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
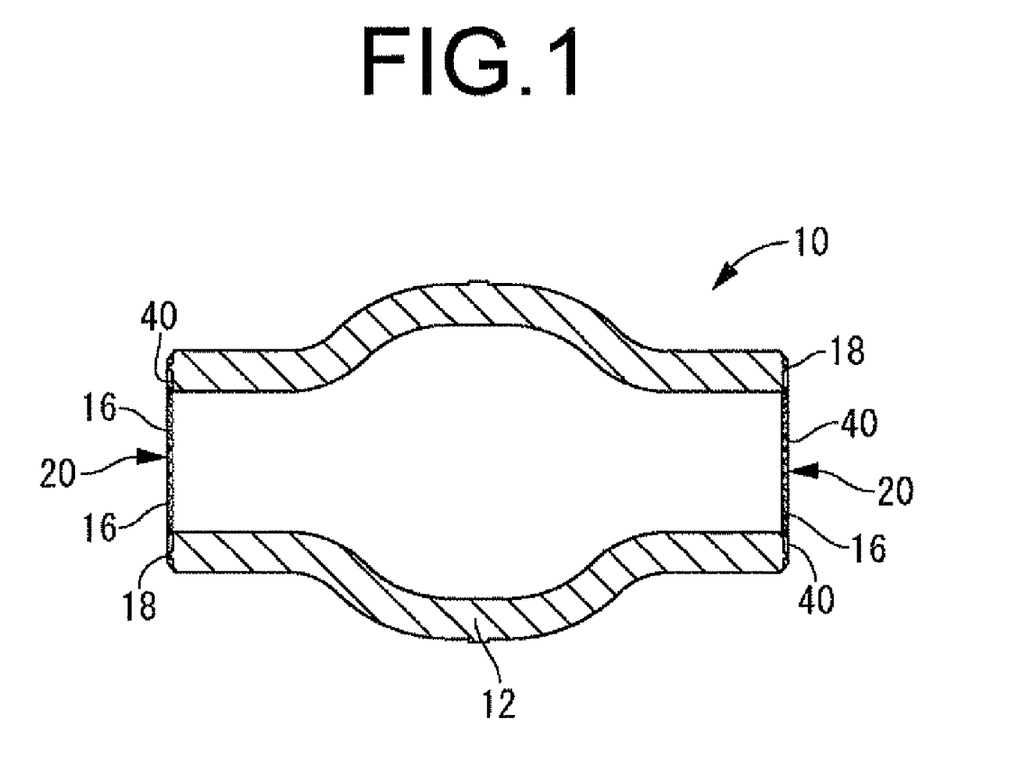
FIG. 1 is an elevational view in axial or vertical cross section of a cylindrical member, which is constructed according to one embodiment of the present invention.
Figure 2:
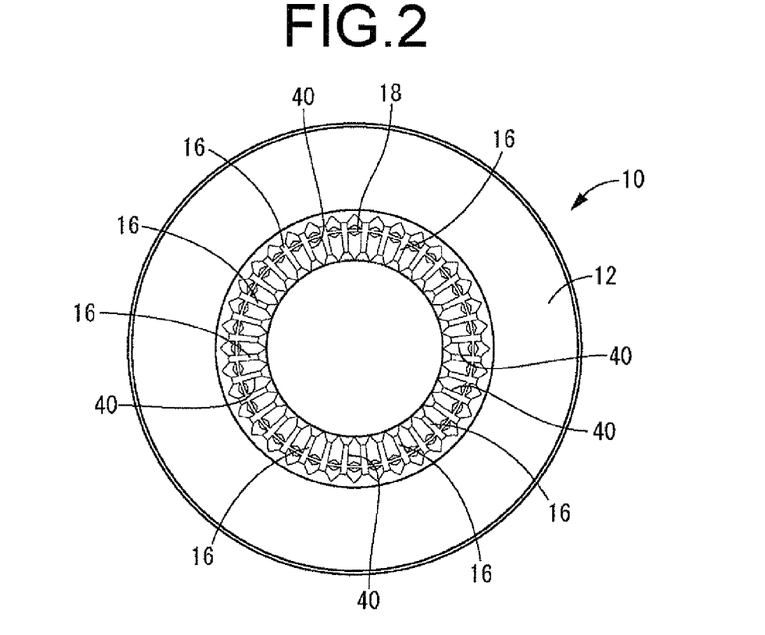
FIG. 2 is an enlarged side view of FIG. 1.
Figure 3:
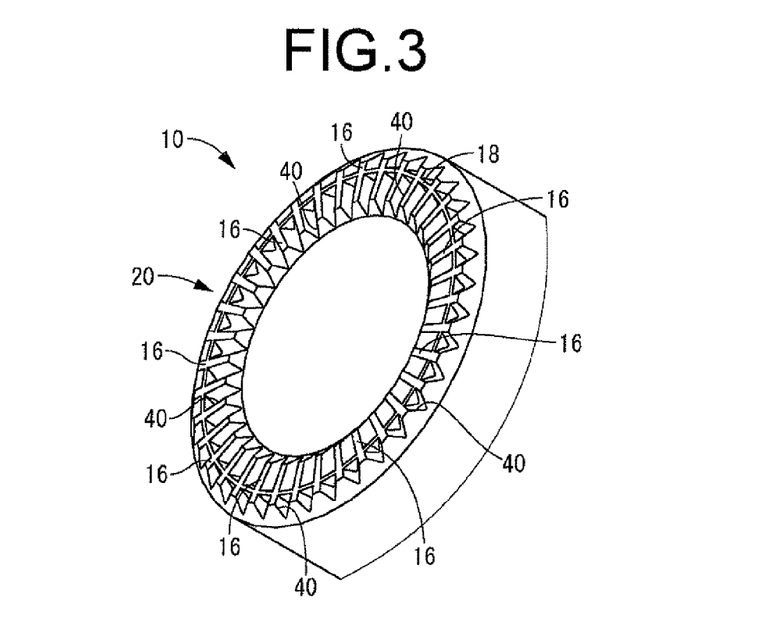
FIG. 3 is an enlarged perspective view of a principal part of the cylindrical member of FIG. 1.

FIGS. 1 to 3 depict a cylindrical member 10 manufactured according to the method of the present invention. The cylindrical member 10 has round cylindrical shape with projections of specific shape formed on both of its axial end faces. A bulging large-diameter portion 12 is formed in the axial center section of the cylindrical member 10 by a process such as bulge forming; the purpose of the large-diameter portion 12 is to produce the intended spring characteristics when implemented in a vibration damping rubber bushing, discussed later, and is not essential to the invention.

Figure 4:
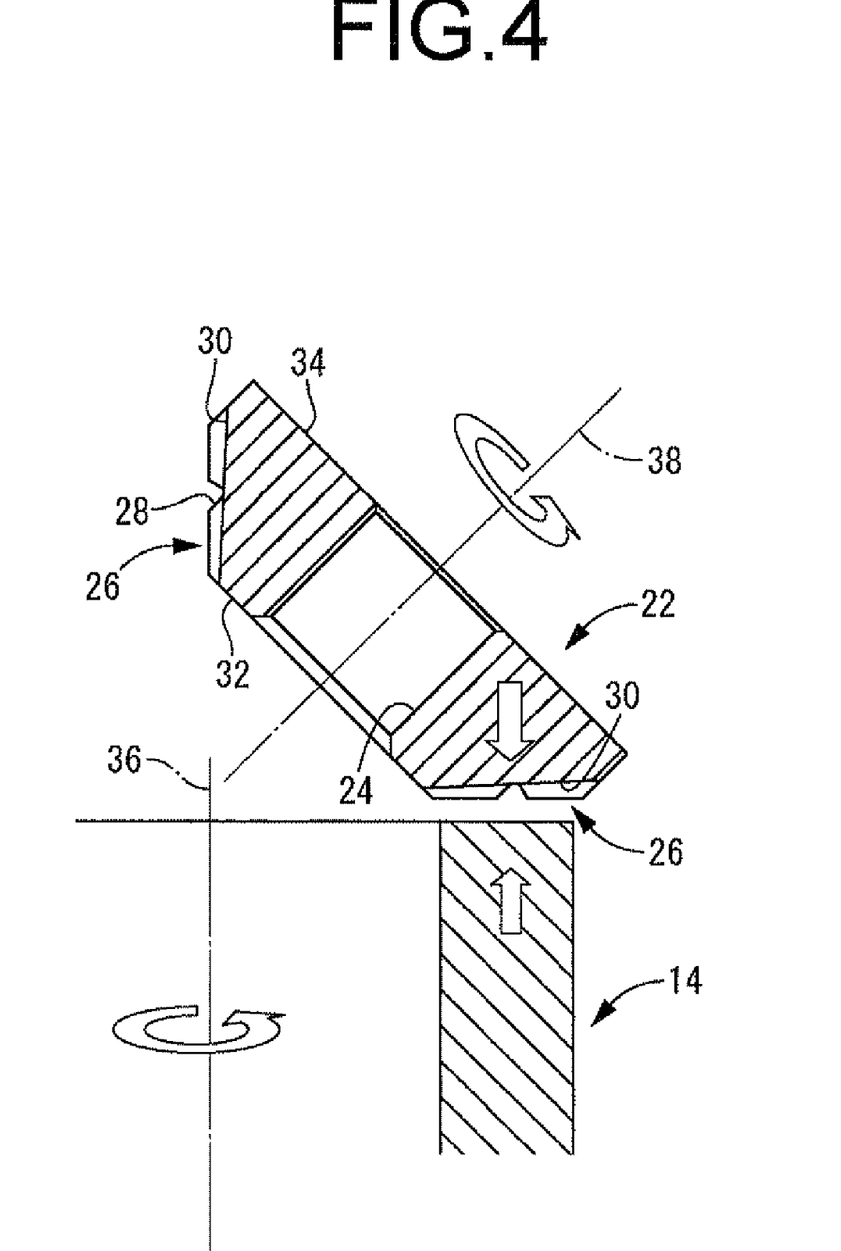
FIG. 4 is an illustration depicting plastic working according to one manufacturing process of the cylindrical member of FIG. 1.

When manufacturing the cylindrical member 10 according to the method of the present invention, first, cylindrical tubing 14 is prepared as the workpiece. The cylindrical tubing 14 is depicted in FIG. 4, and can be manufactured by cutting appropriate lengths of cylindrical metal pipe obtained by known pipe manufacturing processes such as extrusion or drawing for example. The material of the cylindrical tubing 14 may be selected from appropriate materials, such as stainless steel, according to the characteristics required of the cylindrical member 10. The cylindrical tubing 14 may undergo appropriate shaping processes such as formation of the large-diameter portion 12 mentioned above.

Next, the cylindrical tubing 14 is subjected to plastic working of its axial end faces to form a plurality of anti-slip projections 16 that extend in the radial direction, and an annular water barrier projection 18 that extends in the circumferential direction, as depicted in FIG. 3. Specifically, the anti-slip projections 16 and the annular water barrier projection 18 are all integrally formed with the cylindrical member 10, and have projecting contours that project axially outward from axial end faces 20 of the cylindrical member 10.

Figure 5:
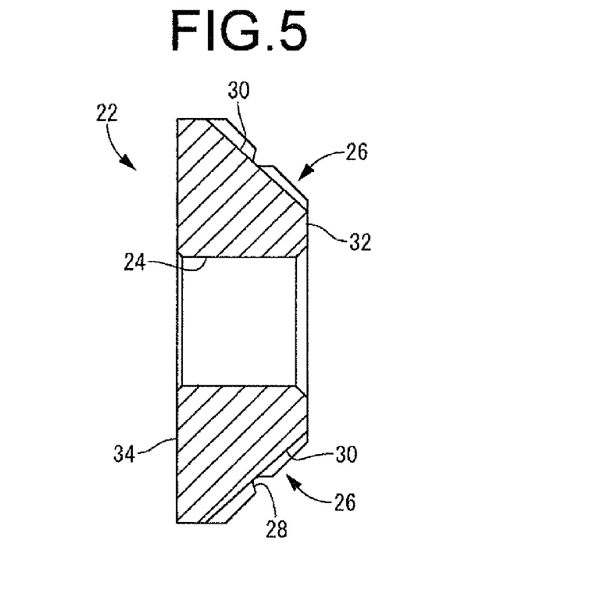
FIG. 5 is an elevational view in axial or vertical cross section of a roller die used for plastic working of FIG. 4, taken along line 5-5 of FIG. 6.
Figure 6:
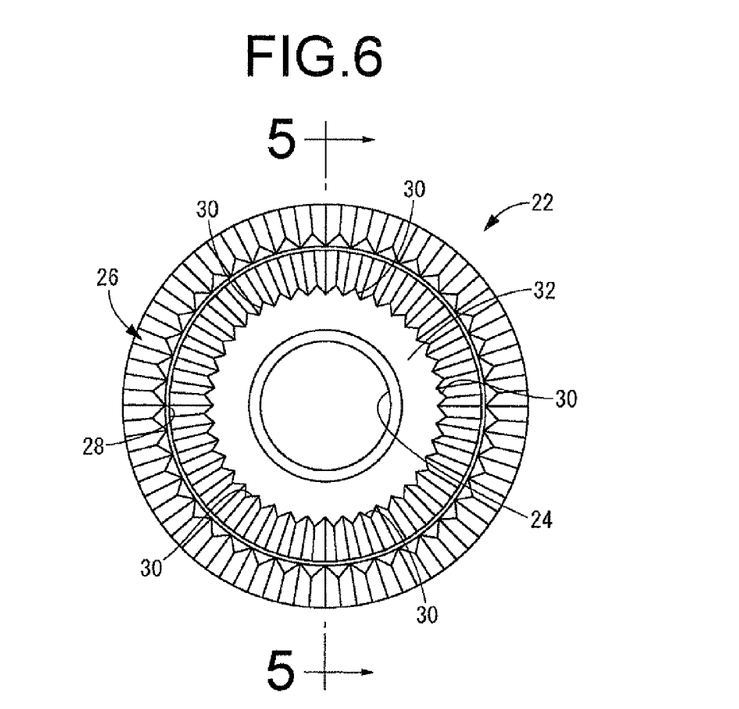
FIG. 6 is a right side view of FIG. 5.

As shown in FIG. 4, during formation of these projections 16, 18, the axial end faces 20 of the cylindrical tubing 14 are subjected to plastic working with a roller die 22 as a specific forming roller. As depicted in FIGS. 5 and 6, the roller die 22 is a single tool of generally truncated conical shape overall. The material of the roller die 22 is selected appropriately from materials such as HSS (high speed tool steel), carbon tool steel, or cemented carbide for example, in consideration of factors such as the material of the cylindrical tubing 14 workpiece, the shape and size of the projections to be formed, and process speed.

A support hole 24 is formed passing through the roller die 22 at its center axis, and a die face 26 is defined by a tapered sloping side face (outer circumferential face). A plurality of die grooves are provided on the die face 26. Specifically, a circumferential die groove 28 of annular form is formed extending continuously in the circumferential direction through the medial section in the generatrix direction of the die face 26. Additionally, a plurality of sloping die grooves 30 extending parallel to the generatrix direction are formed in the tapered slope direction of the die face 26 so as to intersect the circumferential die groove 28 at right angles. The sloping die grooves 30 extend continuously from the small-diameter edge to the large-diameter edge of the die face 26, and intersect the circumferential die groove 28 at equidistant locations along the circumferential direction of the circumferential die groove 28.

The circumferential die groove 28 and the sloping die grooves 30 formed on the die face 26 of the roller die 22 have profiles that correspond to the plurality of projecting profiles to be produced on the axial end face 20 of the cylindrical member 10, with the specific profile being designed according to the intended projecting profiles of the cylindrical member 10. For this reason, the following description of the projecting profiles of the cylindrical member 10 will serve in lieu of a detailed description of the profiles of the circumferential die groove 28 and the sloping die grooves 30.

A support shaft is passed through the support hole 24 of the roller die 22 which has this die face 26 on its side face, so that it is rotatably supported about its center axis by the support shaft. Then, as depicted in FIG. 4, the roller die 22 is positioned with respect to the workpiece, i.e. cylindrical tubing 14, which is rotatably supported about its center axis by a work base or the like, so that the die is situated above the work face, namely, the axial end face 20 of the cylindrical tubing 14. The roller die 22 is positioned with its small-diameter end face 32 facing towards the inner peripheral side of the cylindrical tubing 14 and its large-diameter end face 34 facing towards the outer peripheral side of the cylindrical tubing 14, with its center axis 36 at an angle with respect to the center axis 38 of the cylindrical tubing 14.

The die face 26 of the roller die 22 is thereby positioned in opposition to the axial end face 20 of the cylindrical tubing 14. By setting the intersection angle of the center axis of the roller die 22 and the center axis of the cylindrical tubing 14 according to the slope angle of the generatrix of the roller die 22, the die face 26 of the roller die 22 is oriented approximately squarely parallel to the axial end face 20 of the cylindrical tubing 14.

The cylindrical tubing 14, which is fixedly supported in the axis perpendicular direction by the work base etc., is turned by a motor or other driving means while moving it in the axial direction closer towards the roller die 22 and pushing the axial end face 20 of the cylindrical tubing 14 against the die face 26 of the roller die 22 to carry out the forming process. Specifically, as the cylindrical tubing 14 turns about its center axis, the roller die 22, which is supported rotatably at a fixed position by the support shaft, is pressed against the axial end face 20 of the cylindrical tubing 14, thereby inducing plastic deformation of the work face, i.e. the axial end face 20 of the cylindrical tubing 14. At the same time, through contact resistance with the cylindrical tubing 14, the cylindrical tubing 14 rotates about its center axis in association with rotation of the roller die 22 about the center axis. As a result of this interlocked rotation of the cylindrical tubing 14 and the roller die 22, plastic working by the die face 26 of the roller die 22 takes place along the entire circumference of the axial end face 20 of the cylindrical tubing 14, so that projections 16, 18 corresponding to the circumferential die groove 28 and the sloping die grooves 30 are formed simultaneously on the die face 26.

Where the cylindrical member 10 having anti-slip projections 16 and the annular water barrier projection 18 is formed through plastic deformation by the roller die 22 in this way, it is possible for the annular water barrier projection 18 and the plurality of anti-slip projections 16 to be formed simultaneously by a single roller die 22. For this reason, the equipment needed to form the projections 16, 18 on the cylindrical tubing 14 can be kept simple and held to a minimum, and the cylindrical member 10 can be manufactured easily with a minimum of process steps needed to form the projections 16, 18.

During plastic working by the roller die 22 as described above, at the same time or in a separate process taking place before or after, it is preferable for the inside and outside peripheral edge portions at the axial ends of the cylindrical tubing 14 to be subjected to a tapering process. This will prevent processing burrs at the axial ends from protruding out to the inside or outer peripheral side from the cylindrical tubing 14. The tapering process may be carried out for example by a cutting process using a surface machining bit as taught in FIG. 7 that depicts the prior art in JP-A 5-237582. It is also possible to produce tapered surfaces by plastic working using a roller die. Alternatively, instead of a special roller die for tapering, by providing the die face 26 of the aforementioned roller die 22 in a section thereof between its two edges in the generatrix direction with an integrally formed annular die projection for tapering purposes that projects up from the outer circumferential face and extends in the circumferential direction, it is possible to endow the roller die 22 with a tapering function as well. However, in consideration of the increased rolling resistance of the roller die 22 and the heat of friction associated with planar contact against the tapered face, it is preferable to use a tapering process roller die separate from the roller die 22, or a surface machining bit.

Additionally, instead of turning the cylindrical tubing 14 about its center axis 36 as described above, it is possible to carry out the intended plastic working by imparting the roller die 22 with rotation about its center axis 38 while supporting the cylindrical tubing 14 in a non-rotating condition, to bring about orbital rolling displacement thereof about the center axis 36 of the cylindrical tubing 14.

As depicted in FIGS. 1 to 3, the cylindrical member 10 obtained through plastic working of the cylindrical tubing 14 by the roller die 22 as described above has formed on its axial end face 20 a plurality of radially extending anti-slip projections 16 and an annular water barrier projection 18 extending in the circumferential direction, corresponding to the circumferential die groove 28 and the sloping die grooves 30 of the roller die 22. Specifically, both the anti-slip projections 16 and the annular water barrier projection 18 are integrally formed with the cylindrical member 10, and have projecting contours that project axially outward from the axial end face 20 of the cylindrical member 10.

The anti-slip projections 16 in particular extend linearly in the diametrical direction without slope in the circumferential direction, from points in proximity to the inside peripheral edge to points in proximity to the outside peripheral edge of the axial end face 20 of the cylindrical member 10. Each of the two end faces of the anti-slip projections 16 in their lengthwise direction (i.e. the diametrical direction of the axial end face 20 of the cylindrical member 10) takes the form of a sloping face extending with skirt shape, so as to avoid chipping or deformation of the lengthwise ends of the anti-slip projections 16 associated with knocking against or interference with other components.

The anti-slip projections 16 extend in the diametrical direction with trapezoidal cross section, and have a tapering cross sectional shape whereby the cross sectional width dimension becomes progressively shorter towards the projecting distal edge side. The plurality of anti-slip projections 16 are formed in proximity to one another in the circumferential direction, producing an overall arrangement in which a multitude of anti-slip projections 16 extend in a spokewise pattern centered on the center axis of the cylindrical member 10. That is, the multitude of anti-slip projections 16 give the circumferential cross section of the cylindrical member 10 a continuous saw tooth profile.

Further, the anti-slip projections 16 are all identical in shape and size, and the projecting distal edge faces of all of the anti-slip projections 16 are positioned on the same plane orthogonal to the center axis of the cylindrical member 10. Thus, with the cylindrical member 10 installed in another component with the axial end faces 20 thereof juxtaposed against the flat mounting surfaces of the other component, the projecting distal edges of all of the anti-slip projections 16 will be in contact with the mounting faces. However, it is not essential that the projecting distal edge faces of the anti-slip projections 16 be entirely situated in a single plane, and it is acceptable for example for the projecting distal edge faces of all of the anti-slip projections 16 to be situated on a tapered face that slopes axially outward towards the outer peripheral side. This positions the anti-slip projections 16 so that the edge to the outer peripheral side of their projecting distal edge part comes into contact against the mounting face of the other component before the inside peripheral section does, thereby advantageously causing the anti-slip projections 16 to bite into the other component at their outside peripheral edge portion, and effectively preventing rotation of the cylindrical member 10 about the center axis relative to the other component.

Meanwhile, the annular water barrier projection 18 on the axial end face 20 of the cylindrical member 10 has an annular shape that extends continuously in the circumferential direction through the diametrical medial section. Like the anti-slip projections 16, the annular water barrier projection 18 extends in the circumferential direction with trapezoidal cross section, and has a tapering cross sectional shape of progressively shorter cross sectional width dimension towards the projecting distal edge side.

The annular water barrier projection 18 extends with unchanging cross sectional shape along its entire circumferential length, and the projecting distal edge face of the annular water barrier projection 18 is positioned along its entire length on a single plane orthogonal to the center axis of the cylindrical member 10. Additionally, the projecting distal edge face of this annular water barrier projection 18 is positioned on the same plane as the plane on which are positioned the projecting distal edge faces of the anti-slip projections 16 described above. That is, all of the projecting distal edge faces of both the annular water barrier projection 18 and the plurality of anti-slip projections 16 are positioned on the same plane. Thus, with the cylindrical member 10 installed in another component and the axial end faces 20 thereof juxtaposed against the flat mounting surfaces of the other component, these projecting distal edges, not just of all the anti-slip projections 16 but also of the annular water barrier projection 18, will push against the mounting face.

Further, because the annular water barrier projection 18 is formed in the diametrical medial section of the axial end face 20 of the cylindrical member 10 (in the present embodiment, at a location somewhat eccentric towards the outside in the diametrical direction from the diametrical center as depicted in FIG. 2), all of the anti-slip projections 16 intersect the annular water barrier projection 18.

The projecting distal edge face of the annular water barrier projection 18 extends continuously in the circumferential direction through these intersection points as well, thereby defining a closed ring-shaped face in the circumferential direction adapted to push against the mounting face of another component juxtaposed against the axial end face 20 of the cylindrical member 10. The anti-slip projections 16 also extend respectively towards the inner peripheral side and the outer peripheral side of the annular water barrier projection 18 from their intersection points with the annular water barrier projection 18, and are designed so that both their inside peripheral and outside peripheral segments will push against the mounting face of the other component that has been juxtaposed against the axial end face 20 of the cylindrical member 10.

Slot-like recesses 40 that extend in the diametrical direction are respectively present between circumferentially adjacent anti-slip projections 16, 16 on the axial end faces 20 of the cylindrical member 10. However, the annular water barrier projection 18 cuts across these slot-like recesses 40 in the circumferential direction in their lengthwise medial sections (the diametrical medial section of the axial end face 20). Because the annular water barrier projection 18 is continuous all the way around in the circumferential direction, all of the slot-like recesses 40 are blocked off by the annular water barrier projection 18 and disappear in their lengthwise medial section.

Consequently, where the cylindrical member 10 having axial end faces 20 provided with a combination of the anti-slip projections 16 and the annular water barrier projection 18 as described above is installed in another component with its axial end faces 20 pushing against the mounting faces of the other component, relative displacement of the cylindrical member 10 about its center axis relative to the other component is effectively prevented, and penetration of rainwater to the inner circumferential face of the cylindrical member 10 through gaps between the axial end face 20 of the cylindrical member 10 and the mounting face of the other component may be effectively prevented. To provide a better understanding of the technical effects of this arrangement, a vibration damping rubber bushing is shown by way of example of an article incorporating the cylindrical member 10 described above, and the working effects of the invention will be described in specific terms in relation to this vibration damping rubber bushing.

Figure 7:
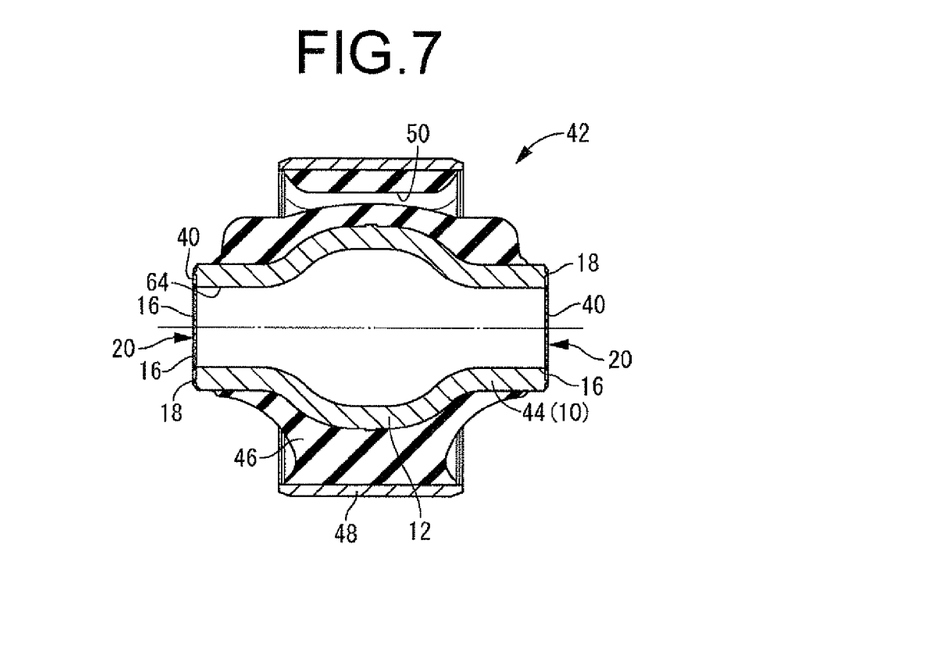
FIG. 7 is an elevational view in axial or vertical cross section of one embodiment of a vibration damping rubber bushing manufactured in accordance with the method of the present invention utilizing the cylindrical member of FIG. 1, taken along line 7-7 of FIG. 8.
Figure 8:
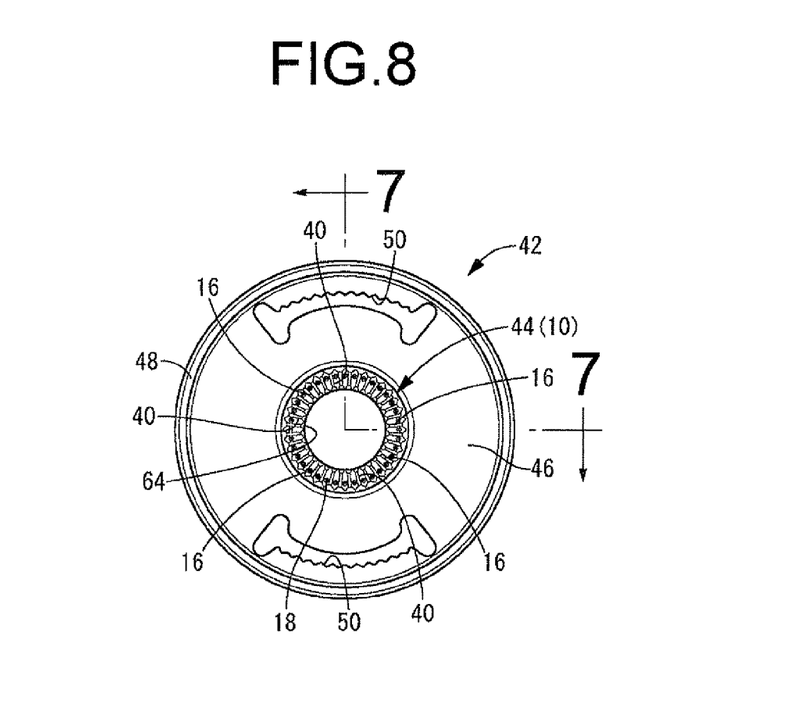
FIG. 8 is a left side view of FIG. 7.

Specifically, FIGS. 7 and 8 depict a vibration damping rubber bushing 42 as one embodiment of an article incorporating the cylindrical member 10 described above. This vibration damping rubber bushing 42 is intended for installation at a mounting location on either the vehicle body end or the wheel end of a suspension arm making up part of an automotive suspension mechanism, and is designed to reduce transmission of road face vibration to the vehicle body.

To describe in greater detail, the vibration damping rubber bushing 42 has an inner cylindrical member 44 composed of the cylindrical member 10 discussed above. This inner cylindrical member 44 is arranged axially passing through the vibration damping rubber bushing 42 on its center axis. A main rubber elastic body 46 is anchored to the outer circumferential face of the inner cylindrical member 44. The main rubber elastic body 46 has thick-walled, generally round cylindrical shape overall, and is anchored at its inner circumferential face to the outer circumferential face of the inner cylindrical member 44. An additional outer cylindrical member 48 of round cylindrical shape is anchored to the outer circumferential face of the main rubber elastic body 46. The outer cylindrical member 48 is thinner than and shorter in axial length than the inner cylindrical member 44, and is positioned on the same center axis as the inner cylindrical member 44 but spaced apart diametrically outward from the inner cylindrical member 44 in the axial center section of the inner cylindrical member 44. This vibration damping rubber bushing 42 is manufactured as an integrally vulcanization molded component through molding and vulcanization of the main rubber elastic body 46 in the presence of the inner and outer cylindrical members 44, 48 for example.

In the present embodiment, a pair of selective recesses 50, 50 extend in the axial direction passing through the diametrical medial section of the main rubber elastic body 46. The pair of selective recesses 50, 50 are situated in opposition along a diametrical axis, and respectively extend between the inner and outer cylindrical members 44, 48 along an arcuate path in the circumferential direction for a length equal to slightly less than one-fourth the circumference. Tuning has been carried out through adjustment of the spring ratio between the direction of opposition of the pair of selective recesses 50, 50 and the diametrical direction orthogonal thereto.

Figure 9:
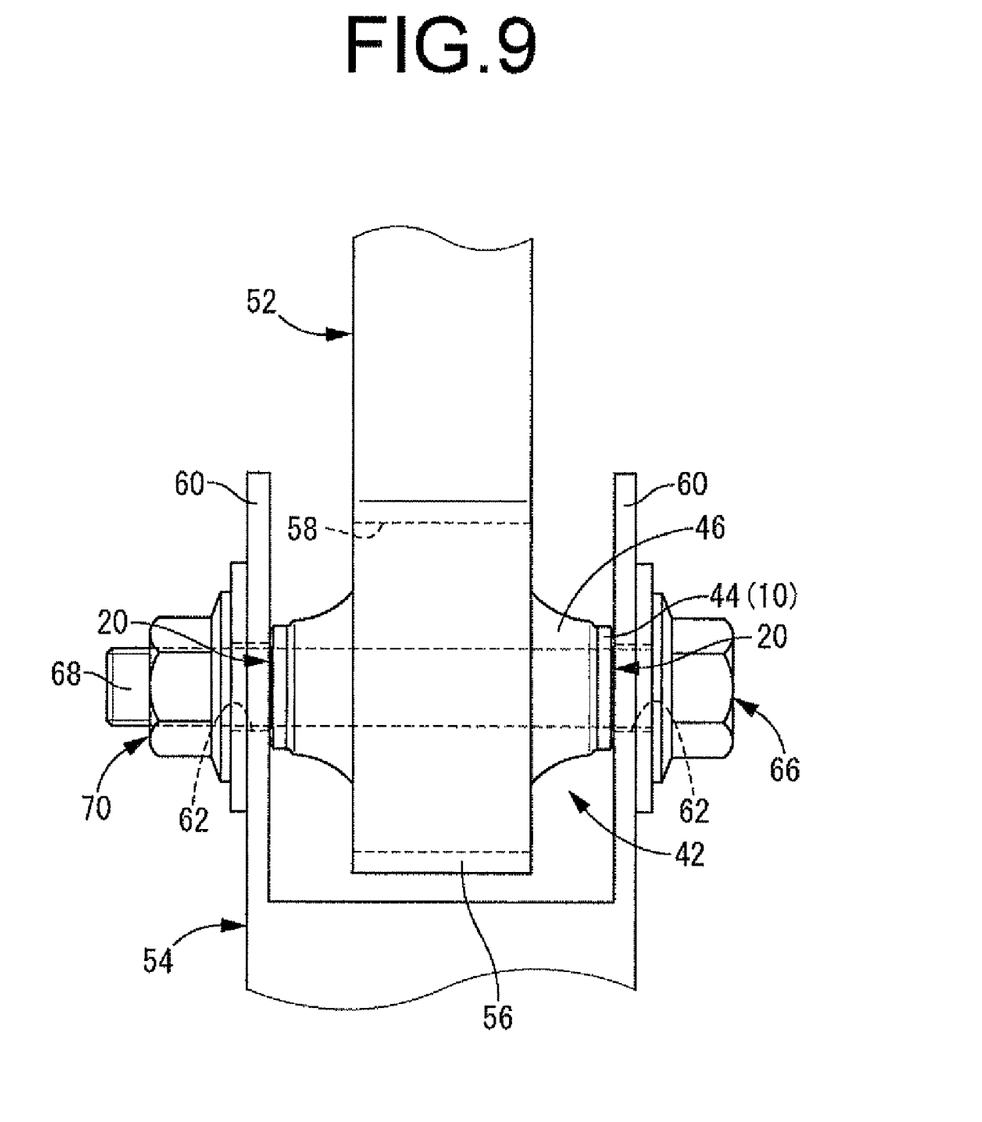
FIG. 9 is an illustration depicting the vibration damping rubber bushing of FIG. 7 installed.

As shown in FIG. 9, the vibration damping rubber bushing 42 is installed at a mounting location with respect to a vehicle body end member 54 of a suspension arm 52. During the installation process, first, the outer cylindrical member 48 of the vibration damping rubber bushing 42 is secured by a pressure fit into an installation hole 58 of an arm eye 56 of round cylindrical shape formed at one end of the suspension arm 52. The vibration damping rubber bushing 42 installed on the suspension arm 52 is then fitted between the opposing faces of a pair of mounting portions 60, 60 formed on the vehicle body end member 54 serving as the other component. The bore 64 of the inner cylindrical member 44 is then aligned with passage holes 62, 62 formed in the pair of mounting portions 60, 60. A mounting bolt 66 is inserted through the passage hole 62 of one of the mounting portions 60, passed through the bore 64 of the inner cylindrical member 44, and projected outward from the passage hole 62 of the other mounting portion 60. A fastening nut 70 is threaded onto a distal end screw portion 68 of the projecting mounting bolt 66 and tightened thereon so that the two axial end faces of the inner cylindrical member 44 are secured pressing against the opposing faces of the pair of mounting portions 60, 60.

With such a vibration damping rubber bushing 42 installed in the vehicle suspension mechanism, in order to consistently produce the intended vibration damping action, it is necessary for the pair of selective recesses 50, 50 made in the main rubber elastic body 46 to be positioned in a specific direction, such as the lengthwise direction of the vehicle. This positioning in the circumferential direction is accomplished by the anti-slip projections 16 discussed above, which project out from the axial end faces 20, 20 of the inner cylindrical member 44. Specifically, the tightening force of the fastening nut 70 onto the mounting bolt 66 pushes the anti-slip projections 16 so that they bite into the mounting portions 60, thereby inhibiting relative rotational displacement of the inner cylindrical member 44 in the circumferential direction relative to the mounting portions 60.

Moreover, owing to the provision of the annular water barrier projection 18 in addition to the anti-slip projections 16 on the axial end faces 20 of the inner cylindrical member 44, while ensuring that the anti-slip projections 16 provide ample rotation inhibiting function of the inner cylindrical member 44 relative to the mounting portions 60, rainwater may be effectively prevented from penetrating into the bore 64 of the inner cylindrical member 44 through the gaps between the inner cylindrical member 44 and the mounting portions 60.

Specifically, with the vibration damping rubber bushing 42 constructed as above installed as depicted in FIG. 9, even if rainwater should seep between the mounting portions 60 of the vehicle body end member 54 and the axial end faces 20 of the inner cylindrical member 44 and thence into the gaps (slot-like recesses 40) between circumferentially adjacent anti-slip projections 16, 16 through their outside peripheral openings, the water will be blocked by the annular water barrier projection 18. Thus, rainwater cannot reach the inside peripheral edge part of the axial end faces 20 of the inner cylindrical member 44, and cannot penetrate into the bore 64 of the inner cylindrical member 44.

Moreover, because the annular water barrier projection 18 is formed in the diametrical medial section of the axial end face 20 of the inner cylindrical member 44, damage to the annular water barrier projection 18 caused by interference or knocking against other components during transport or installation is effectively prevented so that the intended water blocking action described above can be more consistently achieved.

Further, because the anti-slip projections 16 extend in the diametrical direction to both the diametrical inner peripheral side and outer peripheral side of the annular water barrier projection 18, when these anti-slip projections 16 are pushed against and bite into the mounting portion 60 of the vehicle body end member 54, their function of inhibiting rotation of the inner cylindrical member 44 about the center axis relative to the vehicle body end member 54 may be effectively produced unhampered by the annular water barrier projection 18.

In particular, when the anti-slip projections 16 are pushed against the mounting portion 60 of the vehicle body end member 54, they more effectively bite into the mounting portion 60 due to the effect of concentrated pushing force by the edge portions at their ends. Thus, the edge portion at the inside peripheral end and the edge portion at the outside peripheral end of the anti-slip projections 16 which project out to both the inner peripheral side and outer peripheral side from the annular water barrier projection 18 actively bite into the mounting portion 60, so that their function of inhibiting rotation of the inner cylindrical member 44 about the center axis relative to the vehicle body end member 54 is effectively produced. In particular, a high level of rotational moment (resistance force) which acts as rotation-inhibiting force is produced as a result of the large distance separating the center axis of the inner cylindrical member 44 from the edge part of the anti-slip projections 16 at the end thereof situated closer towards the outer peripheral side of the inner cylindrical member 44.

While the present invention has been described in detail hereinabove in terms of its presently preferred embodiment, the invention is in no way limited to the specific disclosure of the embodiment. For example, plastic working by the roller die 22 may be carried out on only a single axial end face of the cylindrical member 10. Specifically, the cylindrical member 10 has various different possible modes of installation, such as being installed with its axial direction aligned with the vertical direction, or installed with a seal rubber disposed to one axial side. When water blocking functionality is required at only one axial end face of the cylindrical member 10, the annular water barrier projection 18 may be provided to only one axial side of the cylindrical member 10. In instances in which the cylindrical member 10 will be installed with only one of its axial end faces pressing against a mounting member or the like, or in instances rotation inhibiting function at a single axial end face will suffice, the anti-slip projections 16 may likewise be formed on one axial end face only.

Also, the circumferential die groove 28 may be discrete from the inside peripheral segments and the outside peripheral segments of the sloping die grooves 30 on the roller die 22 so that the anti-slip projections 16 on the axial end face 20 of the cylindrical member 10 are discrete from the outer peripheral side and the inner peripheral side of the annular water barrier projection 18. In this case, the anti-slip projections 16 segments situated both to the inner peripheral side and to the outer peripheral side of the annular water barrier projection 18 will have an inside peripheral edge and an outside peripheral edge, and the biting action afforded by these additional edges can improve the rotation inhibiting function.

The sloping die grooves 30 formed to either diametrical side of the circumferential die groove 28 on the roller die 22 need not necessarily be formed along mutually identical diametrical lines. For example, it is possible for the sloping die groove 30 segments to the inner peripheral side of the circumferential die groove 28 and the sloping die groove 30 segments to the outer peripheral side to be formed at locations staggered in the circumferential direction with respect one another, or to be formed at mutually different circumferential pitch (i.e. spacing, size, etc.).

Nor is it essential for the sloping die grooves 30 to all extend linearly in the diametrical direction. For example, the grooves may angled with respect to diametrical lines, or in a spiral pattern produced by extending them along angled and curving paths. A spiral pattern in which the sloping die grooves 30 curve towards one side in the circumferential direction is effective in improving rotation inhibiting force in a particular direction of rotation by the anti-slip projections 16 formed thereby.

Multiple circumferential die grooves 28 may be formed so as to produce multiple annular water barrier projections 18 spaced apart in the diametrical direction, according to the required water blocking ability and characteristics of the member against which they are pressed. Where multiple circumferential die grooves 28 are formed spaced apart in the diametrical direction, sloping die groove 30 segments may be formed diametrically therebetween, or not.

Further, the circumferential die groove 28 and the sloping die grooves 30 need not have identical depth dimension, and the projecting distal edge faces of the anti-slip projections 16 and the annular water barrier projection 18 formed by these grooves 28, 30 need not be positioned on the same plane extending in the axis-perpendicular direction of the cylindrical member 10. For example, the projecting distal edge face of the annular water barrier projection 18 may project further outward beyond the anti-slip projections 16 in the axial direction of the cylindrical member 10 so that the extent of bite of the annular water barrier projection 18 into the other component is greater than that of the anti-slip projections 16, so as to provide more consistently high water blocking action. Conversely, the projecting distal edge faces of the anti-slip projections 16 may project further outward beyond the annular water barrier projection 18 in the axial direction of the cylindrical member 10 so that the extent of bite of the anti-slip projections 16 into the other component is greater than that of the annular water barrier projection 18, so as to provide greater rotation inhibiting force. Some number of anti-slip projections 16 may have different projecting heights or shapes in consideration of factors such as the required rotation inhibiting force and the properties of the component against which the projections are pushed. It is also possible for a single anti-slip projection 16 to have varying projecting height and/or shape along its lengthwise direction.

What is claimed is:

1. A method of manufacturing a cylindrical member having anti-slip projections formed on at least one of opposite axial end faces, the method comprising the following steps of:

employing a roller die having an integral tapered outside peripheral face as a die face, which is provided with a circumferential die groove of annular form extending continuously in a circumferential direction through a medial section in a generatrix direction of the die face, and with a plurality of sloping die grooves arrayed along the circumferential direction and extending in a direction of taper of sections of the die face situated respectively to both a large-diameter side and a small-diameter side of the circumferential die groove;

providing plastic working to the axial end face of the cylindrical member using the roller die with the small-diameter side of the roller die facing towards an inner peripheral side of the cylindrical member and with the large-diameter side facing towards an outer peripheral side of the cylindrical member, by pushing the die face of the roller die against the axial end face of the cylindrical member while rotating in the circumferential direction; and forming simultaneously on the axial end face of the cylindrical member an annular water barrier projection that projects axially outward and extends in a circumferential direction in a diametrical medial section thereof, and a plurality of the anti-slip projections of projecting form extending in a diametrical direction to both an inner peripheral side and an outer peripheral side of the annular water barrier projection and arrayed in a spokewise pattern overall in the circumferential direction.

2. The method of manufacturing a cylindrical member according to claim 1, wherein both the circumferential die groove and the sloping die grooves on the roller die have a flared cross sectional profile of progressively larger groove width dimension towards the outside peripheral face of the roller die.

3. The method of manufacturing a cylindrical member according to claim 1, wherein the circumferential die groove and the sloping die grooves of the roller die have mutually identical depth dimension.

4. A method of manufacturing a vibration damping rubber bushing, comprising the following steps of preparing a cylindrical member having anti-slip projections formed on both axial end faces by employing a roller die having an integral tapered outside peripheral face as a die face, which is provided with a circumferential die groove of annular form extending continuously in a circumferential direction through a medial section in a generatrix direction of the die face, and with a plurality of sloping die grooves arrayed along the circumferential direction and extending in a direction of taper of sections of the die face situated respectively to both a large-diameter side and a small-diameter side of the circumferential die groove, by providing plastic working to the axial end face of the cylindrical member using the roller die with the small-diameter side of the roller die facing towards an inner peripheral side of the cylindrical member and with the large-diameter side facing towards an outer peripheral side of the cylindrical member, by pushing the die face of the roller die against the axial end face of the cylindrical member while rotating in the circumferential direction, and by forming simultaneously on the axial end face of the cylindrical member an annular water barrier projection that projects axially outward and extends in a circumferential direction in a diametrical medial section thereof, and a plurality of the anti-slip projections of projecting form extending in a diametrical direction to both an inner peripheral side and an outer peripheral side of the annular water barrier projection and arrayed in a spokewise pattern overall in the circumferential direction; and bonding by vulcanization a main rubber elastic body to an outer circumferential face of the cylindrical member.

* * * * *